(12) United States Patent
Jansson et al.

(10) Patent No.: US 10,590,510 B2
(45) Date of Patent: Mar. 17, 2020

(54) METHOD FOR RECOVERING PRECIOUS METAL

(71) Applicant: OUTOTEC (FINLAND) OY, Espoo (FI)

(72) Inventors: Kaj Jansson, Tampere (FI); Mikko Ruonala; Tuukka Kotiranta, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/351,736

(22) Filed: Mar. 13, 2019

(65) Prior Publication Data
US 2019/0211421 A1    Jul. 11, 2019

Related U.S. Application Data

(63) Continuation of application No. PCT/FI2016/050639, filed on Sep. 14, 2016.

(51) Int. Cl.
*B03D 1/02* (2006.01)
*C22B 3/22* (2006.01)
(Continued)

(52) U.S. Cl.
CPC .............. *C22B 3/22* (2013.01); *B03D 1/02* (2013.01); *B03D 1/1431* (2013.01);
(Continued)

(58) Field of Classification Search
CPC ...... B03D 1/02; B03D 1/1431; B03D 1/1437; B03D 2201/007; B03D 2203/025;
(Continued)

(56) References Cited

U.S. PATENT DOCUMENTS 5,116,487 A * 5/1992 Parekh ............... B03D 1/02
                                              209/164
5,182,014 A * 1/1993 Goodman ........... B03D 1/02
                                              204/277
(Continued)

FOREIGN PATENT DOCUMENTS

CA          1333199      *  3/1988
CN       204307730 U        5/2015
(Continued)

OTHER PUBLICATIONS

Fan et al. "nanobubble generation and its application in froth flotation (part III):specially designed laboratory scale column flotation of phosphate", Mining Science and Technology 20 (2010) pp. 317-338.*

(Continued)

*Primary Examiner* — Thomas M Lithgow
(74) *Attorney, Agent, or Firm* — Robert P. Michal, Esq.; Carter, DeLuca & Farrell LLP

(57) ABSTRACT

A method for recovering at least one precious metal from an aqueous solution containing the metal and particularly to recovery of silver and optionally one or more other precious metals from overflow of a sedimentation unit such as a thickener, a clarifier or a pond includes subjecting the aqueous solution to a micro and/or nanobubble flotation, wherein the pH of the aqueous solution is at most 1.5.

13 Claims, 1 Drawing Sheet

(51) Int. Cl.
*C22B 3/00* (2006.01)
*B03D 1/14* (2006.01)
*C22B 3/20* (2006.01)

(52) U.S. Cl.
CPC .............. *B03D 1/1437* (2013.01); *C22B 3/20* (2013.01); *C22B 11/04* (2013.01); *B03D 2201/007* (2013.01); *B03D 2203/025* (2013.01); *Y02P 10/234* (2015.11)

(58) Field of Classification Search
CPC ......... C22B 3/22; C22B 11/04; C22B 11/042; Y02P 10/234
USPC ....................................................... 209/164
See application file for complete search history.

(56) References Cited

U.S. PATENT DOCUMENTS

| | | | |
|---|---|---|---|
| 2003/0217953 A1* | 11/2003 | Xu | ........................... B03D 1/02 209/163 |
| 2016/0214036 A1 | 7/2016 | Bourke | |

FOREIGN PATENT DOCUMENTS

| | | | |
|---|---|---|---|
| DE | 2620654 | * | 12/1976 |
| DE | 19710529 | A1 | 9/1998 |
| EP | 0059227 | A1 | 9/1982 |
| FI | 881353 | A | 9/1989 |
| FI | 84323 | C | 11/1991 |
| FR | 2313452 | A1 | 12/1976 |
| GB | 2084555 | A | 4/1982 |
| RU | 2057597 | C1 | 4/1996 |

OTHER PUBLICATIONS

Shen, X; Xie, J. Study on silver recovery in the jarosite process for electrolytic zinc production. Kuangye Gongcheng 1992, 12(2), 51-5. abstract Chemical Abstracts [online]. ACS. [retrieved on Dec. 23, 2016] retrieved from: STN International, USA. AN 1993:195496 CAPLUS abstract (5 pages), along with English language translation (6 pages).

Shen, X; Xie, J. Study on silver recovery in the jarosite process for electrolytic zinc production. Kuangye Gongcheng 1992, 12(2), 51-5. abstract Chemical Abstracys [online]. ACS. [retrieved on Dec. 23, 2016] retrieved from: STN International, USA. AN 1993:195496 CAPLUS abstract.

Written Opinion of the International Searching Authority issued by the Finnish Patent and Registration Office acting as the IInternational Searching Authority in relation to International Application No. PCT/FI2016/050639 dated Jan. 12, 2017 (8 pages).

International Search Report issued by the Finnish Patent and Registration Office acting as the International Searching Authority in relation to International Application No. PCT/FI2016/050639 dated Jan. 12, 2017 (5 pages).

Extended Search Report issued by the European Patent Office in relation to European Application No. 16916154.4 dated Aug. 23, 2019 (5 pages).

Calla-Choque D et al, Acid decomposition and thiourea leaching of silver from hazardous jarosite residues: Effect of some cations on the stability of the thiourea system. Journal of Hazardous Materials, May 31, 2016, vol. 317, p. 440-448. doi:10.1016/j.jhazmat.2016. 05.085 abstract p. 442, chapter 2.2.3.

Han, H et al. Anglesite and silver recovery from jarosite residues through roasting and sulfidization-flotation in zinc hydrometallurgy. Journal of Hazardous Materials, Jun. 5, 2014, vol. 278, p. 49-54 abstract.

Syed S, Silver recovery aqueous techniques from diverse sources: Hydrometallurgy in recycling. Review. Waste Management Feb. 27, 2016, vol. 50, p. 234-256, p. 242-248 Chapter 4.1 Hydrotechnologies.

* cited by examiner

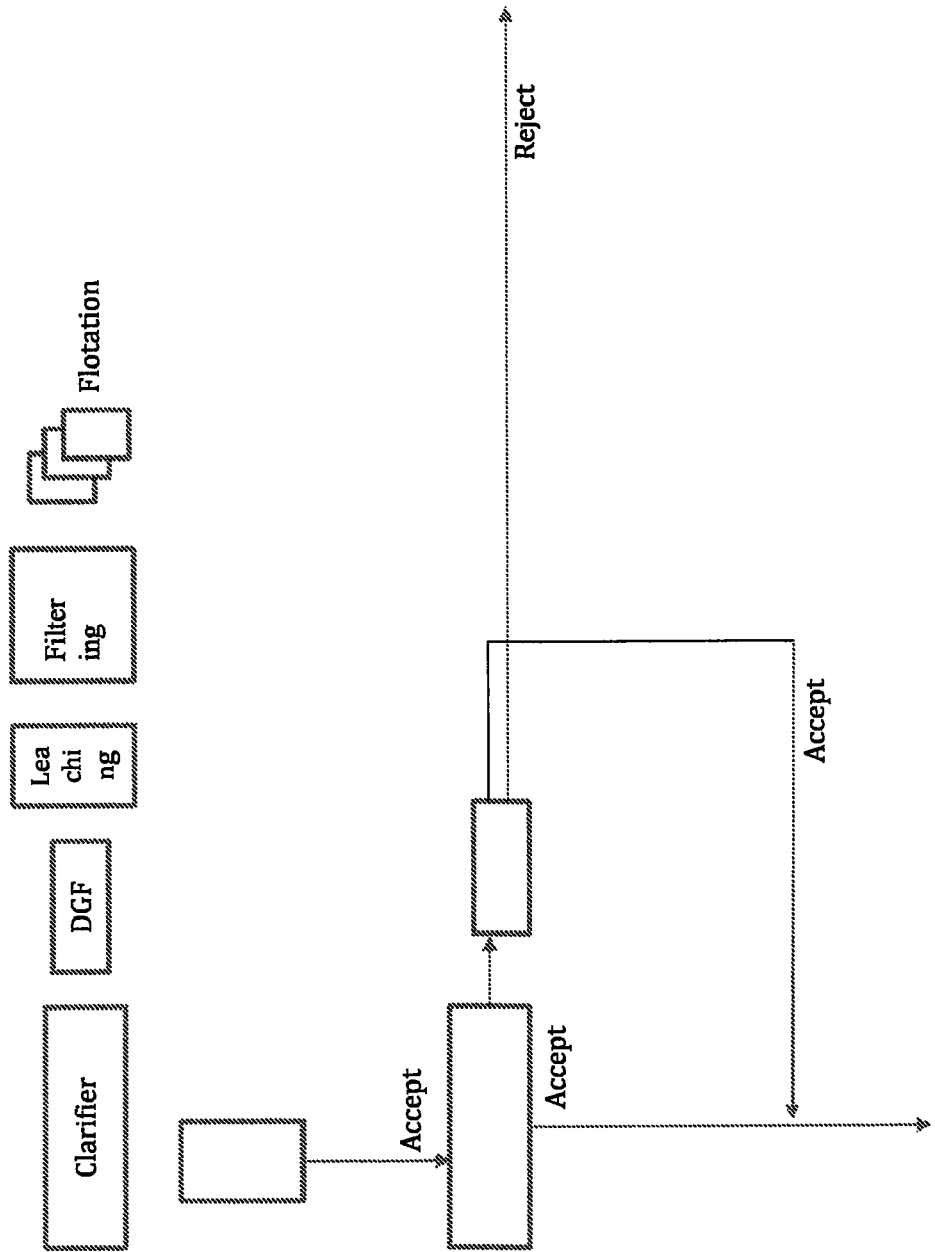

METHOD FOR RECOVERING PRECIOUS METAL

CROSS-REFERENCE TO RELATED APPLICATIONS

This application is a continuation of PCT International Application No. PCT/FI2016/050639 filed Sep. 14, 2016, the disclosure of this application is expressly incorporated herein by reference in its entirety.

FIELD OF THE INVENTION

The present invention relates to a method of recovering at least one precious metal from an aqueous solution containing said metal and particularly to recovery of silver and optionally one or more other precious metals from overflow of a sedimentation unit such as a thickener, a clarifier or a pond.

BACKGROUND OF THE INVENTION

Recovery of fine colloidal material from solutions where the solid particles are very small and/or where the solids content is low has proven to be difficult, especially when the solution has a very low pH (<1.5), like strong acid leach stage thickener overflow. The very low pH is achieved by high acid content, which also means that the solution has high viscosity.

In these conditions, typical separation methods are too expensive or the particle size is too small for filtration and/or precipitation, for example.

Different filtration methods have been tested to recover the fine colloidal material from strong acid leach stage thickener overflow, however without any luck. Either filters have not been able to remove the fines, or the filters elements have been totally clogged, or the filter itself could not just handle the very difficult environment of the process without disintegrating.

One of the disadvantages associated therein is that valuable substances are lost, which leads to reduced extraction yields of the desired substances and increased operating costs.

BRIEF DESCRIPTION OF THE INVENTION

An object of the present invention is to provide a method which alleviates the disadvantages relating to traditional recovery methods. The object of the invention is achieved by a method, which is characterized by what is stated in the independent claim. Further embodiments of the invention are disclosed in the dependent claims.

It has proved to be challenging to recover precious metals from overflow of a sedimentation unit such as a thickener, a clarifier or a pond, due to the small size of the particles. Particle size distribution of the particles in said overflow is typically $P_{80}$ less than 40 µm, preferably $P_{80}$ less than 10 µm.

Now, flotation applications utilizing micro- and/or nanobubbles that have been generated with technologies like induced gas flotation (IGF), dissolved gas flotation (DGF), column flotation and electroflotation, have shown to be able to remove the suspended solids. For example with electroflotation method, the efficiency is over 70%.

The size of a nanobubble is typically under 1 µm and microbubbles are typically between 1-1000 µm. In the ordinary froth flotation, the bubbles are between 600-2 500 µm. With smaller bubbles it is possible to remove finer particles that are escaping ordinary mineral flotation step.

Accordingly, the present invention is based on the usage of a micro and/or a nanobubble flotation in the recovery of the at least one precious metal. In this application the bubble size is between 0.5-250 µm, preferably 5-200 µm. The present method is especially suitable for recovering silver from an overflow of a sedimentation unit such as a thickener, a clarifier or a pond.

An advantage of the present invention is that precious metals, such as silver, can be recovered efficiently instead of losing them directly to the waste dam.

BRIEF DESCRIPTION OF THE DRAWINGS

In the following the invention will be described in greater detail by means of preferred embodiments with reference to the attached drawing.

FIG. 1 is a block diagram of an exemplary embodiment of the invention, showing an arrangement comprising a leaching unit, a clarifier and a DGF-unit.

DETAILED DESCRIPTION OF THE INVENTION

The present invention relates to a method of recovering small particles containing at least one precious metal from an aqueous solution containing said metal with a micro- and/or a nanobubble flotation unit.

Particularly the present invention relates to recovery of silver and optionally one or more other precious metals from overflow of a sedimentation unit such as a thickener, a clarifier or a pond.

A major part of solids is separated from the initial solution in sedimentation step. Typically above 80%, more typically above 90%, of the solids is removed in the sedimentation step. The small solids particles that are not settled, will follow the liquid phase to the overflow. The fine particles in the overflow contain significant amount of precious metals and therefore the recovery of solids from the overflow is feasible. The fine particles originate from the previous processing steps, where material is first leached and then precipitated. The fine particles are mostly precipitated material.

The aqueous solution subjected to a micro- and/or a nanobubble flotation comprises precious metal containing small particles in low solid concentration below 5000 mg/L, typically below 1000 mg/L, more typically below 500 mg/L. Particle size distribution of the particles in said overflow is typically $P_{80}$ under 40 µm, preferably $P_{80}$ under 10 µm.

Thus, the present invention relates to a method of recovering at least one precious metal from an aqueous solution containing said metal which method comprises subjecting said solution to a micro- and/or a nanobubble flotation. In one embodiment, the pH of the solution in the micro- and/or the nanobubble flotation process is at most 1.5. In one embodiment, the pH of the solution in the micro- and/or the nanobubble flotation process is in the range of 0.5 to 1.5. In one embodiment, the pH of the solution is about 0.5.

In one embodiment, the aqueous solution is an overflow of a sedimentation unit.

In one embodiment the micro- and/or the nanobubble flotation is induced gas flotation (IGF). In one embodiment the micro- and/or the nanobubble flotation is dissolved gas flotation (DGF). In one embodiment the micro- and/or the nanobubble flotation is electroflotation. In one embodiment the micro- and/or the nanobubble flotation is column flotation.

In one embodiment, precious metal is selected from the group comprising silver, gold, ruteniumin, rodiumin, palladiumin, osmiumin, iridiumin, platinum or any combination thereof.

In one embodiment, the precious metal is silver. Thus, in one embodiment, the present invention relates to a method for recovery of silver and optionally one or more other precious metals from an aqueous silver containing solution. In one embodiment, the aqueous silver containing solution is overflow of a sedimentation unit such as a thickener, a clarifier or a pond.

After leaching, silver is as a poorly soluble precipitate in the form of silver jarosite $AgFe_3(SO_4)_2(OH)_6$ or other poorly soluble compounds. Since the silver containing precipitate can be precipitated as very fine material and due to the fine particle size it do not settle fast enough to in a settling unit to be recovered in there. Due to the fine particle size the filtration is also difficult. The ordinary froth flotation does not separate dilute solid slurries with fine particles from the solution since the bubble size is too big.

In one embodiment, the zinc content of the aqueous solution in the micro- and/or the nanobubble flotation process is over 60 g/L.

In one embodiment, the particle size $P_{80}$ of the particles in the feed solution is under 40 μm, preferably under 10 μm.

In one embodiment, the pH of the solution is adjusted with the addition of $H_2SO_4$, HCl, $HNO_3$ or any combination thereof. In one embodiment, the pH is adjusted with the addition of $H_2SO_4$ and/or HCl.

In one embodiment, the micro- and/or the nanobubbles are generated with dissolved gas flotation (DGF) unit. In one embodiment, the micro- and/or the nanobubbles are generated with induced gas flotation (IGF) unit. In one embodiment, the micro- and/or the nanobubbles are generated with an electroflotation unit. In one embodiment, the micro- and/or the nanobubbles are generated with a column flotation unit.

In one embodiment, the gas in the micro- and/or the nanobubbles is air. In one embodiment, the gas in the micro- and/or the nanobubbles is oxygen enriched air. In one embodiment, the gas in the micro- and/or the nanobubbles is oxygen.

In one embodiment, the gas in the micro- and/or the nanobubbles is hydrogen. In one embodiment, the gas in the micro- and/or the nanobubbles is a combination of oxygen and hydrogen.

In one embodiment, the gas in the micro- and/or the nanobubbles is nitrogen.

In one embodiment, the gas in the micro- and/or the nanobubbles is helium.

In one embodiment, the gas in the micro- and/or the nanobubbles is argon.

In one embodiment, the gas in the micro- and/or the nanobubbles is xenon.

Typically chemicals such as flocculants and/or coagulants, as well as ordinary mineral flotation chemicals can be utilized in the micro- and/or the nanobubble flotation to improve the recovery of the at least one precious metal. The flocculants and coagulants are known in the art and are provided by Kemira, for example.

In one embodiment, a flocculant and a coagulant are used in the micro- and/or the nanobubble flotation of the present invention. In one embodiment, a flocculant without any coagulant is used in in the micro- and/or the nanobubble flotation of the present invention.

The present method is especially suitable for recovering silver from industrial solutions, such as silver containing overflow of a sedimentation unit such as a thickener, a clarifier or a pond.

The fact that a precious metal can be recovered from an aqueous solution containing said metal with the present method is remarkable. Typically, the metal containing particles are so small that they will follow the liquid flow and thus end up to the overflow. In addition, the small particles as well as residues of the chemicals present in the solution generally block the filters used in the field.

EXAMPLES

Example 1

An overflow of a thickener was treated with an electroflotation unit in a laboratory scale.

In the DAF test unit electric current is led to the electrodes located at the bottom of the test unit. Electric current breaks small part of the water molecules into the $H_2$ and $O_2$ gases. Produced gas bubbles (size of 10-50 μm) rise to the surface and lift the solid particles to the surface of the unit forming surface sludge. The needed electric current and the amount of produced gas bubbles depend on the water salinity and solution TSS amount and have to be adjusted case by case.

Test—Product and Wash Liquid Data

| Kind of process/product | |
| --- | --- |
| Product: | strong acidic process overflow |
| Operation: | solids removal/dissolved air flotation |
| Process water: | |
| Temperature: | average >90° C. |
| Solids content: | min 0, max 60 000 mg/l |
| | average 3 000 mg/l, last 2 months ~ 2 000 mg/l |
| pH: | <1, $H_2SO_4$ 50-70 g/l |
| Cl level: | >200 mg/l |
| Flocculant used in the process thickener: Superfloc A100 HMW | |
| Tested sample: | |
| Temperature: | ~80° C. |
| Solids content: | 2.3-2.6 g/l |
| Turbidity: | ~150 FTU |
| pH: | <1 |
| density: | 1350-1400 g/l |
| Particle Size Distribution: | |
| d10 1.95/2.24 μm | |
| d50 6.59/20.9 μm | |
| d90 37.4/50.4 μm | |

DAF Gas Bubbling Tests

The tested strong acid water was treated with DAF without and with chemical addition with several chemicals with different doses. Testing was conducted in a fume hood and hydrogen sulphide alarm device was inserted near the DAF unit to see if any hydrogen sulphide was freed during testing. The clarified water sample was taken about five centimetre below the water surface through a sample hose after the flotation time was over. Turbidity was analyzed from all the samples and solid content from the samples that were most clear. Tests were conducted in two days and the solid content was analyzed each day from 0-samples: 2.6 and 2.3 g/l, respectively.

At first the sludge was treated with DAF without any chemical addition. The gas bubbling time was 5 minutes followed by 5 minutes floating time. After that all three best flocculants were tested without any coagulant addition. Next day were tested coagulants+flocculants together. All together nineteen tests were conducted by changing the chemicals and dosages. Also a few tests were made with different air bubbling time and by changing the bubbling current.

No big difference in foam formation could be seen in different tests. The foam thickness was about 1-1.5 centimetres and the color was light brownish. The color of the clarified water was green and some solids could be seen floating in it after the test period. The air bubbling time was five minutes in most of the tests and the floating time five minutes in all the tests.

The results with DAF using different flocculants and combinations of different flocculants and coagulants are given below (Table 1).

TABLE 1

| Sample | Test procedure | Chemical | Turbidity/ TSSFTU/ mg/l | Removal Turbidity/ TSS % |
|---|---|---|---|---|
| | 0-sample in 1st test day | | 152/2.6 | |
| 1 | — | — | 130/— | 14.5/— |
| 2 | 5 minute bubbling 4.7 A with 5 minute flotation | N300 3 ppm | 85/— | 44.1/— |
| 3 | 5 minute bubbling 3.7 A with 5 minute flotation | N100 3 ppm | 66/98 | 56.6/62.3 |
| 4 | 5 minute bubbling 3.7 A with 5 minute flotation | A100HMW 3 ppm | 86/— | 43.4/— |
| | 0-sample in 2nd test day | | 152/2.3 | |
| 5 | 5 minute bubbling 3.7 A with 5 minute flotation | PAX 300 ppm + N100 3 ppm | 64/— | 57.9/— |
| 6 | 5 minute bubbling 2.75 A with 5 minute flotation | PAX 600 ppm + N100 4 ppm | 68/0.68 | 55.3/70.4 |
| 7 | 5 minute bubbling 2.75 A with 5 minute flotation | PIX 600 ppm + N100 4 ppm | 69/— | 54.6/— |
| 8 | 5 minute bubbling 2.75 A with 5 minute flotation | PIX 300 ppm + N100 3 ppm | 63/0.48 | 58.6/79.1 |
| 9 | 5 minute bubbling 2.75 A with 5 minute flotation | C592 300 ppm + N100 3 ppm | 150/— | 1.3/— |
| 10 | 5 minute bubbling 2.75 A with 5 minute flotation | PAX 300 ppm + N100 2 ppm | 73/— | 52.0/— |
| 11 | 1 minute bubbling 2.75 A with 5 minute flotation | PAX 300 ppm + N100 3 ppm | 124/— | 18.4/— |
| 12 | 5 minute bubbling 2.75 A with 5 minute flotation | PAX 300 ppm + N100 1 ppm | 97/— | 36.2/— |
| 13 | 5 minute bubbling 2.75 A with 5 minute flotation | N100 3 ppm | 92/0.50 | 39.5/78.3 |
| 14 | 6.5 minute bubbling 2-5 A with 5 minute flotation | C592 10 ppm + N100 1 ppm | 133/— | 12.5/— |
| 15 | 10 minute bubbling 1.3-4 A with 5 minute flotation | C592 20 ppm + N100 2 ppm | 52/0.68 | 65.8/70.4 |
| 16 | 6 minute bubbling 2.3 A with 5 minute flotation | C592 10 ppm + N100 1 ppm | 110/— | 27.6/— |
| 17 | 10 minute bubbling 2.75 A with 5 minute flotation | C592 20 ppm + N100 2 ppm | 84/0.78 | 44.7/66.1 |
| 18 | 10 minute bubbling 3.69 A with 5 minute flotation | C592 20 ppm + N100 2 ppm | 76/0.80 | 50.0/65.2 |
| 19 | 10 minute bubbling 1.7 A with 5 minute flotation | C592 20 ppm + N100 2 ppm | 81/1.1 | 46.7/52.2 |

The above results show clearly that solids can be removed from overflow of a sedimentation unit such as a thickener, a clarifier or a pond using the method of the present invention.

It will be obvious to a person skilled in the art that, as the technology advances, the inventive concept can be implemented in various ways. The invention and its embodiments are not limited to the examples described above but may vary within the scope of the claims.

The invention claimed is:

1. A method of recovering at least one precious metal from an aqueous solution containing said metal, which comprises subjecting said aqueous solution to a micro- and/or a nanobubble flotation, wherein the pH of the aqueous solution is at most 1.5 and at least a portion of the flotation bubbles have a size of less than 100 μm.

2. The method as claimed in claim 1, wherein the aqueous solution is an overflow of a sedimentation unit such as a thickener, a clarifier or a pond.

3. The method as claimed in claim 1, wherein the zinc content of the aqueous solution is over 60 g/l.

4. The method as claimed in claim 1, wherein the particle size $P_{80}$ of the particles in the feed solution is under 40 μm.

5. The method as claimed in claim 1, wherein the precious metal is selected from the group comprising silver, gold, rutenium, rodium, palladium, osmium, iridium, platinum or any combination thereof.

6. The method as claimed in claim 5, wherein the precious metal is silver.

7. The method as claimed in claim 1, wherein the pH is in the range of 0.5-1.5.

8. The method as claimed in claim 1, wherein the pH is adjusted with the addition of $H_2SO_4$, HCl, $HNO_3$ or any combination thereof.

9. The method as claimed in claim 8, wherein the pH is adjusted with the addition of $H_2SO_4$ and/or HCl.

10. The method as claimed in claim 1, wherein the micro- and/or the nanobubble flotation unit is an induced gas flotation (IGF) unit.

11. The method as claimed in claim 1, wherein the micro- and/or the nanobubble flotation unit is a dissolved gas flotation (DGF) unit.

12. The method as claimed in claim 1, wherein the micro- and/or the nanobubble flotation unit is an electroflotation unit.

13. The method as claimed in claim 1, wherein the micro- and/or the nanobubble flotation unit is a column flotation unit.

* * * * *